United States Patent [19]

Inoko

[11] Patent Number: 4,610,347

[45] Date of Patent: Sep. 9, 1986

[54] DIVIDING DEVICE FOR COLLECTING COMMODITIES INCORPORATED IN A COMMODITY COLLECTING DEVICE

[75] Inventor: Kenji Inoko, Shiga, Japan

[73] Assignee: Tetra Pak International Aktiebolag, Lund, Sweden

[21] Appl. No.: 771,210

[22] Filed: Aug. 30, 1985

[30] Foreign Application Priority Data

Sep. 3, 1984 [JP] Japan ................. 59-185263

[51] Int. Cl.[4] .............................. B65G 47/26
[52] U.S. Cl. ................... 198/425; 198/432; 198/434
[58] Field of Search ............... 198/419, 425, 426, 427, 198/429, 432, 433, 434; 414/60, 61, 68

[56] References Cited

U.S. PATENT DOCUMENTS

3,923,144 12/1975 Langen ................. 198/429
4,397,599 8/1983 Sabel ................. 414/68 X

FOREIGN PATENT DOCUMENTS

1055611 1/1967 United Kingdom ................. 198/419

Primary Examiner—Joseph E. Valenza
Assistant Examiner—Jonathan D. Holmes
Attorney, Agent, or Firm—Koda and Androlia

[57] ABSTRACT

A dividing device used in a commodity collecting device which aligns a predetermined number of commodities successively supplied by a conveyance conveyor and continually pushes them out sideways by a sideway pusher to regularly collect commodities on a stock yard, the dividing device including a floor onto which the collected commodity group is discharged by a discharge pusher, the floor being divided into front and rear floors with respect to the moving direction of the discharge pusher, the front floor on which a part of the commodities on the stock yard is discharged being designed to move in the same direction as the moving direction of the discharge pusher so as to separate only a part of the commodities, and rear pusher engagable with the rear end of the commodity group being provided above the stationary rear floor so that the remaining part of the commodities may be pushed out onto the front floor from which the commodities have been discharged.

1 Claim, 8 Drawing Figures

DIVIDING DEVICE FOR COLLECTING COMMODITIES INCORPORATED IN A COMMODITY COLLECTING DEVICE

BACKGROUND OF THE INVENTION

1. Field of the Invention

The present invention relates to a device for collecting a plurality of a predetermined number of commodities into groups, and more particularly, to a dividing device for a collecting device in which commodities are temporarily collected into a large group each including commodities more than a required number, and then, they are divided into smaller groups of an intended number of commodities.

2. Prior Art

Usually, a commodity, such as a package for beverages shown in FIG. 7, is put together with other commodities so that they are integrally wrapped so as to be delivered to the marketplace.

A collecting device for commodities having the following construction has been known. The commodities successively supplied by a conveyance conveyor are intercepted by a pair of vertical conveyors provided at both sides of the conveyance conveyor, then a predetermined number of the commodities are supplied forward to be aligned and pushed out from a side by a pusher. This operation is repeated to collect a predetermined number of the commodities.

The commodity groups collected in the above described process are discharged respectively in units by another pusher or the like for shrink-wrapping or the like.

However, in a collecting device for the commodities wherein the commodites successively supplied by a conveyance conveyor are aligned in a group of a predetermined number of commodities and are then pushed out sideways by a pusher, time is unavoidably lost during the collecting operation.

In particular, it is impossible to align new commodities on the conveyance conveyor while the pusher reciprocates to push out the aligned commodities sideways. Further, the commodities aligned on the conveyance conveyor cannot be pushed out while the collected commodity groups are being discharged.

Therefore, particularly when the number of commodities collected in one group is relatively small, the disadvantage of losing time is increased many times and operation performance is greatly lowered.

SUMMARY OF THE INVENTION

The inventor of the present invention found that less time is lost when a greater number of commodities are pushed out by one operation, or when a greater number of commodities are collected.

Taking this point into consideration, the main object of the present invention is to provide a dividing system wherein a larger number of commodities than the desired number of commodities collected are temporarily collected, and then, are divided and discharged to the next process, i.e. shrink-wrapping or another process, so that the collecting operation can be performed efficiently.

In keeping with the principles of the present invention, the above and other objects of the invention are accomplished by a unique structure for a dividing device for collected commodities used for a device for collecting commodities which operates to align a predetermined number of commodities successively supplied by a conveyance conveyor and repeatedly pushes them out sideways by a pusher to regularly collect many commodities. The dividing device includes a floor onto which the collected commodity group is discharged by a pusher. The floor is divided into two parts (front and rear parts) with respect to the moving direction of the pusher. The forward floor on which a first part of the pushed-out commodity group is placed is designed to move in the same direction as the moving direction of the pusher so that only the first part of the collected commodity group is separated from the other commodities and discharged. A rear pusher which is engageable with the rear end of the pushed out commodity group is provided on the rear floor so that the remainder of the commodity group or the second part of the commodity group can be pushed onto the forward floor from which the commodities have been discharged.

BRIEF DESCRIPTION OF THE DRAWINGS

The accompanying drawings illustrate an example of the dividing device for commodities incorporated into a commodity collecting device according to the present invention, wherein.

DETAILED DESCRIPTION OF THE INVENTION

Figure 1:
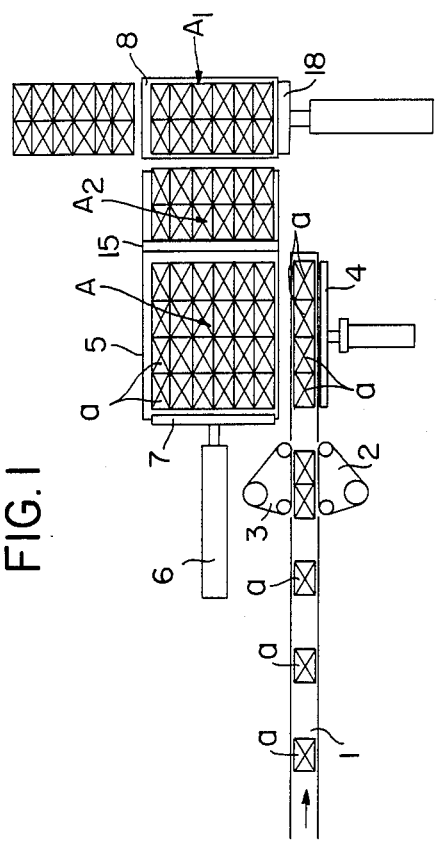
FIG. 1 is a plan view of the whole collecting device.

First, the principles of the present invention will be discussed in accordance with the accompanying drawings.

In a device wherein commodities successively supplied by a conveyance conveyor 1 are aligned respectively in predetermined numbers and an operation for pushing them out sideways by a pusher 4 is repeated to regularly collect commodities, a pusher 7 is provided for discharging the whole collected commodity group A forward.

The floor onto which the collected commodity group A is discharged by the pusher 7 is divided longitudinally into two floor 8 and 13 with respect to the moving direction of the pusher 7. The front floor 8 is designed such that a small commodity group A1 of an intended number of the commodities can be exactly placed thereon. The front floor 8 is slightly movable longitudinally. When the floor 8 moves forward, the group of the commodities is separated from a group of commodities on the stationary floor 13, and then, is discharged by an associated pusher 18 to the next process.

Further, a rear pusher 15, which engages with the rear end of the commodity group pushed out by the pusher 7, is provided at the rear end of the stationary rear floor 13. Thus, the rear pusher 15 pushes the remaining commodity group A2 onto the front floor 8 from which the small commodity group A1 has been discharged.

More specifically, when in operation the commodities supplied by the conveyance conveyor 1 are aligned in a predetermined number, then are discharged sideways by the pusher 4. This operation is repeated to collect the commodity group A on the stock yard 5 (see FIGS. 1 and 2).

Figure 3:
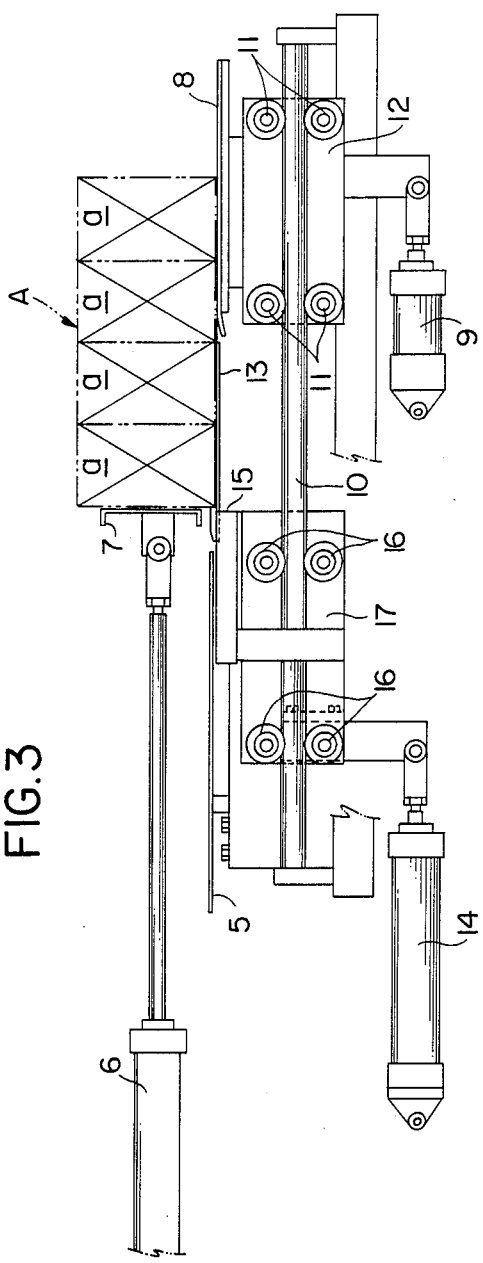
Figure 4:
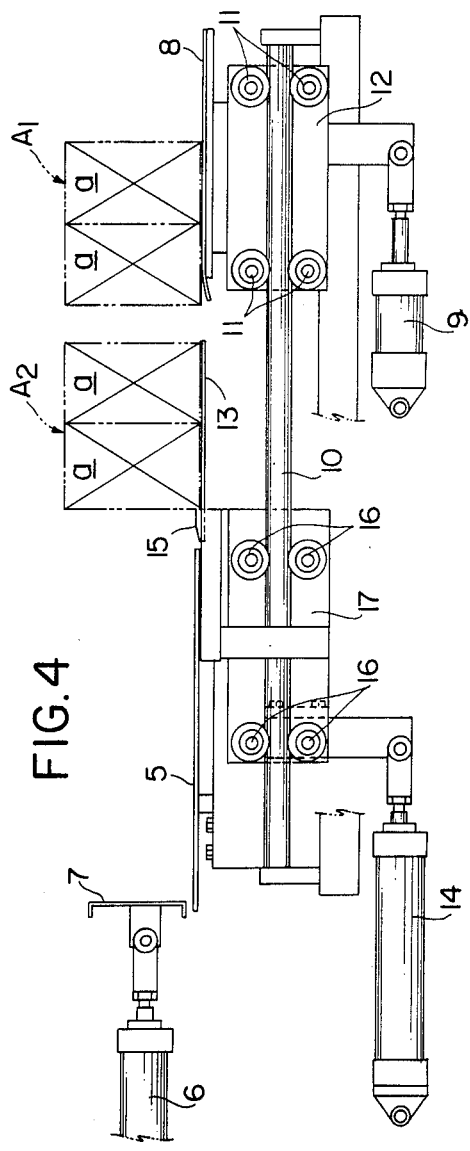

When the commodity group A is pushed out by the pusher 7 which is provided behind the stock yard 5, the commodity groups are placed on the downstream floors 8 and 13 (see FIG. 3). Thereafter, only the front floor 8 moves forward (to the right in the drawing), so that the commodity group A1 thereon is separated from the other commodity group A2 on the rear floor 13 (see FIG. 4).

Then, the associated pusher 18 discharges the commodity group A1 which is on the front floor 8. The forward floor 8 returns to the initial position, and simultaneously, the commodity group A2 on the rear floor 13 is pushed by the rear pusher 15 onto the front floor 8. Then the commodity group A2 is discharged by the pusher 18 in the same way as in the above described operation.

During the dividing and discharging operation, the pusher 7 for pushing out the whole commodity group A returns to the initial position, and a new commodity group is collected on the stock yard 5.

Hereinafter, embodiments of a dividing device for commodities incorporated into a commodity collecting device in accordance with the present invention will be decribed in detail.

Figure 7:
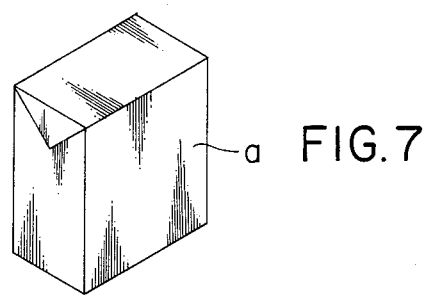
FIG. 7 is a perspective view illustrating an example of a commodity to be collected.
Figure 8:
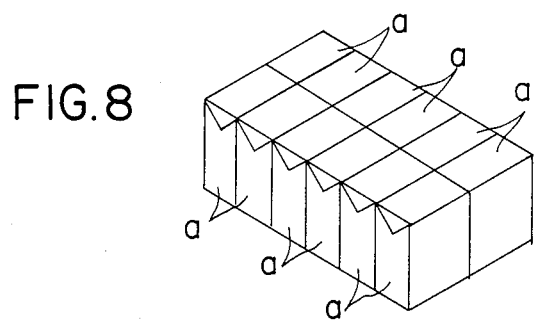
FIG. 8 is a perspective view illustrating an example of collected commodities.

In the accompanying drawings, an embodiment is illustrated wherein the commodities labeled a shown in FIG. 7 are collected into a group 2×6 in number as shown in FIG. 8.

Referring to FIG. 1, which is a plan view, the commodities a successively supplied on a conveyance conveyor 1 are temporarily intercepted by a pair of vertical conveyors 2 and 3 disposed at both sides thereof. The vertical conveyors 2 and 3 are driven to supply four commodities forward.

When the forefront commodity is intercepted, the four commodities a are aligned in a jammed condition and are discharged sideways onto the stock yard 5 by a pusher 4. This operation is repeated six times so that the group A consisting of 4×6 commodities is formed on the stock yard 5.

At the rear end of the stock yard 5, a pusher 7 driven by a cylinder 6 is provided to discharge the whole commodity group A from the stock yard 5.

Figure 2:
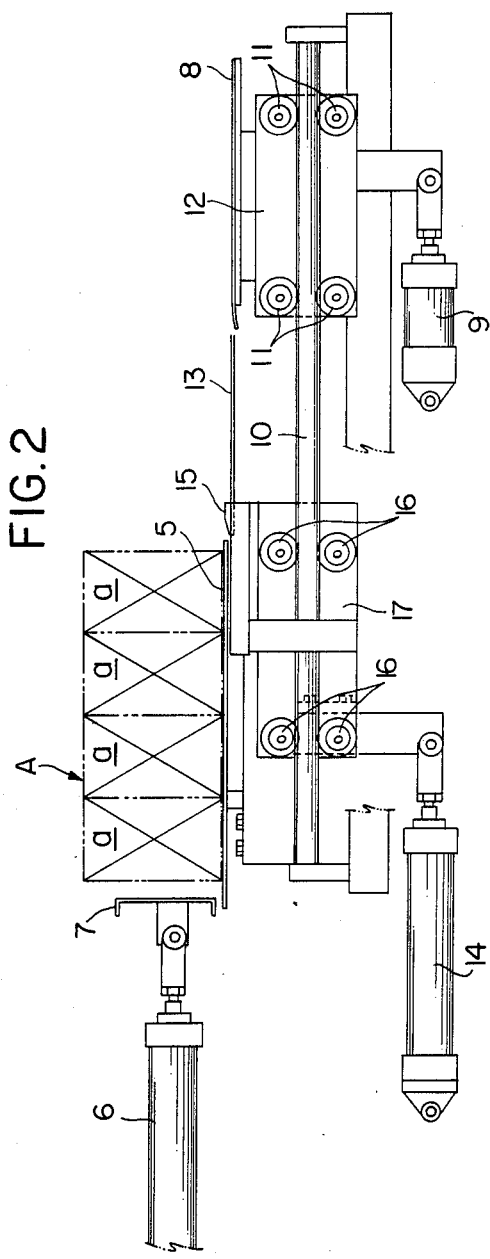
FIGS. 2, 3, 4 and 5 are elevational views illustrating a sequence of the dividing system in a collecting device.
Figure 6:
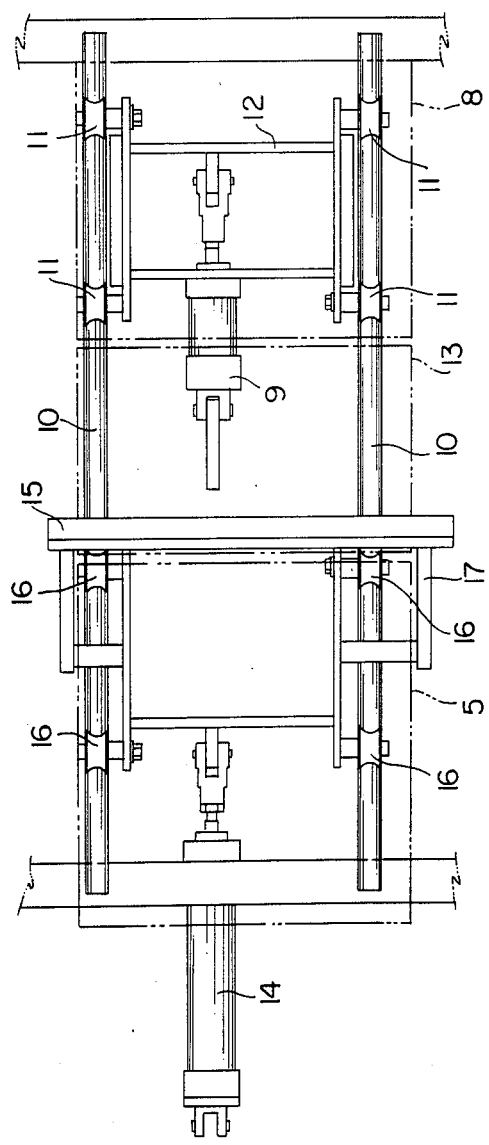
FIG. 6 is a plan view of FIG. 2.

A floor onto which the commodity group A is discharged by the pusher 7 is, as is apparent from FIG. 2, divided into two portions, front and end portions respectively. The front floor 8 is adapted to be moved by a cylinder in the same direction as the pusher 7 moves. In other words, the floor 8 is supported by a support frame 12 including wheels 11 for rolling on a guide rod 10. The support frame 12 is connected to the cylinder 9 for forward and rearward movement (see FIGS. 2 and 6).

On the other hand, a rear pusher 15 adapted to be moved forward and rearward by a cylinder 14 is provided at a rear end of the rear floor 13, which is a stationary floor. The rear floor 13 consists of a narrow plate-like member which is similar to the front floor 8. The rear pusher 15 is supported by a support frame 17 which includes wheels 16 for rolling on the guide rod 10. The rear pusher 15 can engage with the lower and rear end of the commodity group A on the floor 13.

In particular, the floors 8 and 13 are positioned a little lower than the stock yard 5, and the upper surface of the rear pusher 15 is positioned on the same plane as the surface of the stock yard 5, so that the commodity group A may pass over the rear pusher 15. The rear pusher 15 is designed to move from the rear end of the floor 13 to the forward end thereof.

By means of the above structure, the commodity group A collected on the stock yard 5, as shown in FIG. 2, is pushed out by the pusher 7 onto the floors 8 and 13 (see FIG. 3).

Thereafter, the cylinder 9 moves the front floor 8 forward so that the group A of the 4×6 commodities are separated into groups A1 and A2, each including 2×6 commodities. The separated commodity group A1 is discharged by another pusher 18 to the next process (see FIG. 1).

During the above operation of the pusher 18, the pusher 7 returns to the initial position, and the next collecting operation starts on the stock yard S.

Figure 5:
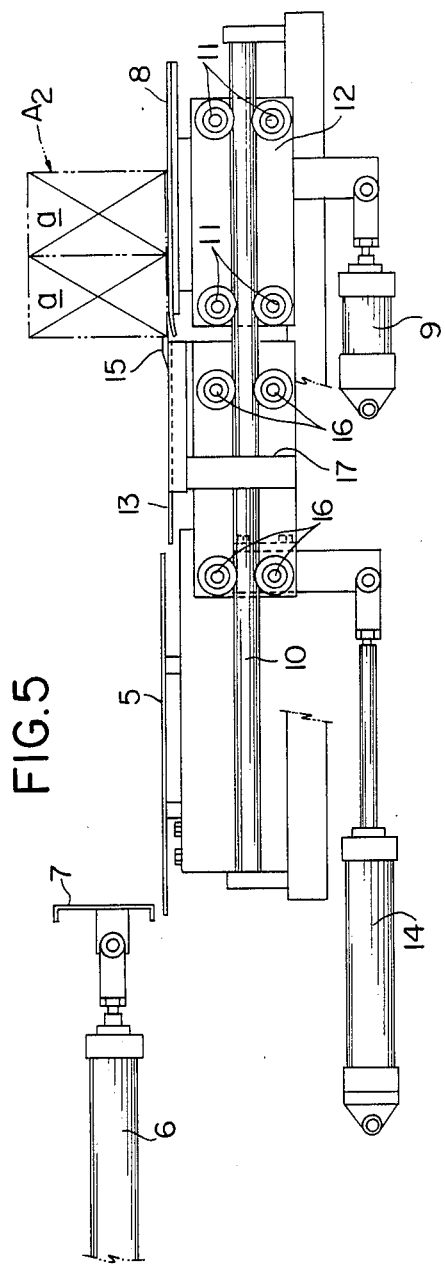

At the same time as the floor 8 from which the commodity group A1 has been discharged returns to the initial position, the rear pusher 15 driven by the cylinder 14 moves forward to push out the remaining commodity group A2 on the floor 13 onto the forward floor 8 (see FIG. 5). According to the above operation, the 4×6 commodities which are collected in group A are discharged as the groups A1 and A2, respectively consisting of 2×6 commodities, to the next process. The operation is repeated to successively collect the intended number of commodities.

In the illustrated embodiment, the collected main commodity group is divided into two sub-groups. However, it may be divided into three sub-groups.

In this case, the rear floor 13 is twice as large as the front floor 8, so that one third of commodities in the main group can be placed on the front floor 8. The rear pusher 15 is designed to move forward in two steps, so that the commodity group A2 on the floor 13 may be pushed out half at a time.

In order to collect a predetermined number of commodities, e.g. to collect the commodities n×m in number, the conventional method requires that n number of commodities be pushed out for m times by a pusher to the stock yard. Therefore, the loss of time, in which the commodities are prevented from being aligned occurs m times for the groups of n×m commodities.

Further, the loss of time, in which the collecting operation cannot be performed, due to the operation of the pusher for discharging the collected commodities, occurs once while collecting the n×m number of commodities.

Contrary to the above, according to the present invention, if the commodities of, e.g. 2n×m in number are temporarily collected, the time loss caused by the pusher 4 for pushing out the commodities to the side occurs m times for the 2n×m commodities, and time loss caused by the discharging operation for the collected commodity group occurs once for the 2n×m commodities. Therefore, the time loss can be reduced by half when compared with conventional devices.

As stated above, according to the present invention, the time loss caused by the operation of the pushers is remarkably reduced, and thus, the collecting operation of the commodities can be performed efficiently. In other words, high speed processing is advantageously possible when the collection operation is in progress.

I claim:

1. A dividing device for dividing collected commodities incorporated in a device for collecting commodities which aligns a predetermined number of commodities successively supplied by a conveyance conveyor and continually pushes them out sideways by a first pusher to regularly collect many commodities, said dividing device being characterized in that a floor onto which the collected commodity group is discharged by a second pusher is divided into front and rear floors with respect to the moving direction of the second pusher, the front floor on which a part of the commodites in the pushed out commodity group is placed being provided with means to move said front floor in the same direction as the moving direction of the second pusher so as to enable only said part of the commodities to be separated from other commodities in the group to be discharged, and a rear pusher engageable with the rear end of the commodity group pushed out by said second pusher is provided on the rear floor so that the remaining part of the commodities may be pushed out onto the front floor from which said part of the commodities have been discharged.

* * * * *